(12) United States Patent
Liao et al.

(10) Patent No.: US 11,354,275 B2
(45) Date of Patent: Jun. 7, 2022

(54) METHOD, ELECTRONIC DEVICE AND COMPUTER PROGRAM PRODUCT FOR FILE MANAGEMENT

(71) Applicant: EMC IP Holding Company LLC, Hopkinton, MA (US)

(72) Inventors: Lanjun Liao, Chengdu (CN); Qingxiao Zheng, Chengdu (CN); Yi Wang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 188 days.

(21) Appl. No.: 16/460,859

(22) Filed: Jul. 2, 2019

(65) Prior Publication Data
US 2020/0301889 A1   Sep. 24, 2020

(30) Foreign Application Priority Data

Mar. 22, 2019 (CN) .......................... 201910221208.9

(51) Int. Cl.
| | |
|---|---|
| *G06F 16/174* | (2019.01) |
| *G06F 16/14* | (2019.01) |
| *G06F 3/06* | (2006.01) |
| *G06F 16/16* | (2019.01) |
| *G06F 16/13* | (2019.01) |
| *G06F 16/188* | (2019.01) |

(52) U.S. Cl.
CPC ........ *G06F 16/1748* (2019.01); *G06F 3/0608* (2013.01); *G06F 3/0641* (2013.01); *G06F 3/0659* (2013.01); *G06F 16/13* (2019.01); *G06F 16/148* (2019.01); *G06F 16/16* (2019.01); *G06F 16/174* (2019.01); *G06F 16/192* (2019.01)

(58) Field of Classification Search
CPC .... G06F 16/1748; G06F 16/192; G06F 16/13; G06F 16/16; G06F 16/174; G06F 16/148; G06F 3/0641; G06F 3/0643; G06F 3/0667; G06F 16/168; G06F 3/0608; G06F 3/0659; G06F 3/061; G06F 3/0671; G06F 9/30141; G06F 16/137
See application file for complete search history.

(56) References Cited

U.S. PATENT DOCUMENTS

| | | | | |
|---|---|---|---|---|
| 5,454,101 | A  * | 9/1995 | Mackay | .............. G06F 16/9017 |
| 6,427,123 | B1 * | 7/2002 | Sedlar | ................... G06F 16/284 |
| | | | | 702/2 |
| 8,271,558 | B1 * | 9/2012 | Caklovic | ............... G06F 16/192 |
| | | | | 707/828 |

(Continued)

*Primary Examiner* — David T. Brooks
(74) *Attorney, Agent, or Firm* — Womble Bond Dickinson (US) LLP (57) ABSTRACT

Embodiments of the present disclosure provide a method, an electronic device and a computer program product for file management. The method includes: generating an extended list based on a path list associated with predetermined files, the extended list comprising a set of paths in the path list that are at least partly the same from a root directory; generating an identifier indicating the extended list; and updating the path list based on the identifier. In this way, the embodiments of the present disclosure accomplish optimization of a path list by creating an extended list, to reduce a number of searching performed based on the path list and thus improve the efficiency of searching a file.

14 Claims, 5 Drawing Sheets

(56) References Cited

U.S. PATENT DOCUMENTS

| | | | | |
|---|---|---|---|---|
| 8,321,484 B2* | 11/2012 | Davis | ................... | G06F 16/166 |
| | | | | 707/827 |
| 9,367,330 B1* | 6/2016 | Puustinen | ............. | G06F 9/4406 |
| 2002/0138502 A1* | 9/2002 | Gupta | ................. | G06F 16/10 |
| 2006/0129521 A1* | 6/2006 | Chen | ................... | G06F 11/1435 |
| 2007/0276848 A1* | 11/2007 | Kim | ..................... | G06F 16/148 |
| 2009/0164537 A1* | 6/2009 | Huang | ................... | G06F 16/13 |
| 2009/0307241 A1* | 12/2009 | Schimunek | ............ | G06F 16/13 |
| 2011/0184932 A1* | 7/2011 | Hennum | ............ | G06F 16/9038 |
| | | | | 707/711 |
| 2011/0191305 A1* | 8/2011 | Nakamura | ........... | G06F 3/0641 |
| | | | | 707/692 |
| 2013/0198130 A1* | 8/2013 | Resch | .................. | G06F 3/0619 |
| | | | | 707/609 |
| 2013/0212136 A1* | 8/2013 | Nishida | .................. | G06F 16/11 |
| | | | | 707/830 |
| 2014/0330986 A1* | 11/2014 | Bowes | ............... | H04L 63/0823 |
| | | | | 709/247 |
| 2017/0083406 A1* | 3/2017 | Qi | ....................... | G06F 11/1451 |
| 2019/0129972 A1* | 5/2019 | Borate | ................. | G06F 16/128 |
| 2020/0133787 A1* | 4/2020 | Cai | ...................... | G06F 16/113 |

\* cited by examiner

METHOD, ELECTRONIC DEVICE AND COMPUTER PROGRAM PRODUCT FOR FILE MANAGEMENT

CROSS-REFERENCE TO RELATED APPLICATION

This patent application claims priority, under 35 U.S.C. § 119, of Chinese Patent Application No. 201910221208.9, filed Mar. 22, 2019, entitled "METHOD, ELECTRONIC DEVICE AND COMPUTER PROGRAM PRODUCT FOR FILE MANAGEMENT," which is incorporated by reference herein its entirety.

FIELD

Embodiments of the present disclosure generally relate to the field of file management, and more specifically, to a method, an electronic device and a computer program product for file management.

BACKGROUND

With the rapid development of information and storage technologies, an electronic device typically stores a large number of files therein. When users perform an operation of backup, virus check, or the like, in order to improve the efficiency, it is often required to perform the related operation only on some important files or system files, rather than performing backup or virus check on all of the files. However, in some cases, the electronic device probably stores massive files, and even though the related operation is required to perform only on a small part of files which are important, it will take a lot of time and resources for the electronic device to find the small part of files from the massive files, and the overall efficiency of the electronic device when performing a backup or virus-check operation is reduced accordingly.

SUMMARY

The embodiments of the present disclosure provide a method, an electronic device and a computer program product for file management.

In a first aspect of the present disclosure, there is provided a method of file management. The method comprises: generating an extended list based on a path list associated with predetermined files, the extended list comprising a set of paths in the path list that are at least partly the same from a root directory; generating an identifier indicating the extended list; and updating the path list based on the identifier.

In a second aspect of the present disclosure, there is provided an electronic device. The electronic device comprises: a processor; and a memory storing computer program instructions, the processor executing the computer program instructions in the memory to control the electronic device to perform acts comprising: generating an extended list based on a path list associated with predetermined files, the extended list comprising a set of paths in the path list that are at least partly the same from a root directory; generating an identifier indicating the extended list; and updating the path list based on the identifier.

In a third aspect of the present disclosure, a computer program product is provided. The computer program product is tangibly stored in a non-transient computer storage medium and comprises machine executable instructions. The machine executable instructions, when executed by a device, cause the device to perform the method as described in the first aspect of the present disclosure.

It would be appreciated that this Summary is not intended to identify key features or essential features of the present disclosure, nor limit the scope of the present disclosure. Other features of the present disclosure would become apparent through the following description.

BRIEF DESCRIPTION OF THE DRAWINGS

Through the following detailed description with reference to the accompanying drawings, the above and other objectives, features and advantages of the present disclosure will become more apparent. Several example embodiments of the present disclosure will be illustrated by way of example but not limitation in the drawings in which.

DETAILED DESCRIPTION OF EMBODIMENTS

The conception of the present disclosure will now be described with reference to various example embodiments illustrated in the drawings. It would be appreciated that description of those embodiments is merely to enable those skilled in the art to better understand and further implement example embodiments disclosed herein and is not intended for limiting the scope disclosed herein in any manner. It should be noted that similar or same reference symbols are employed in the drawings and refer to the same or similar elements. Those skilled in the art would appreciate that alternative embodiments of the structure and/or method described herein may be employed without departing from the principles and conception of the present disclosure.

In the context of the present disclosure, the term "includes" and its variants are to be read as open-ended terms that mean "includes, but is not limited to;" the term "based on" is to be read as "based at least in part on;" the term "an embodiment" is to be read as "at least one example embodiment;" and the term "another embodiment" is to be read as "at least one other embodiment". Other terms probably covered and not mentioned herein, unless clearly indicated otherwise, should not be explained or defined in a way contrary to the conception on which embodiments of the present disclosure are based.

As described above, when users perform some operations on the electronic device, it is often only required to perform related operations on some files, in order to improve the efficiency. Taking a file backup operation as an example, if an electronic device stores 10,000 files therein, users probably need to back up 1,000 predetermined files therefrom when performing the file backup operation. The electronic device needs to obtain a path list including paths of the 1,000 predetermined files, and then, a path of a file in the electronic device is compared with each path in the path list to determine whether the file is a file to be backed up. Since the electronic device stores 10,000 files therein and each file is compared with the 1,000 paths in the path list, the electronic device needs to perform up to ten million comparisons to finally determine the files need to be backed up. With growth of the file number, the electronic device may consume more time and resources, causing a reduction in the overall efficiency of file backup.

In order to solve the above problem and/or other potential problems, embodiments of the present disclosure provide a solution for file management. The solution can generate an extended list including based on a path list associated with predetermined files, the extended list including a set of paths which are at least partly the same from a root directory in the set of path list. The solution can generate an identifier of the extended list. The solution can update the path list based on the identifier. In this way, the solution can optimize a path list, to reduce a number of searching performed based on the path list and thus improve the file searching efficiency.

Basic principles and implementations of the present disclosure will be described with reference to the drawings. It would be appreciated that description of the example embodiments is merely to enable those skilled in the art to better understand and further implement embodiments of the present disclosure and is not intended for limiting the scope disclosed herein in any manner.

Figure 1:
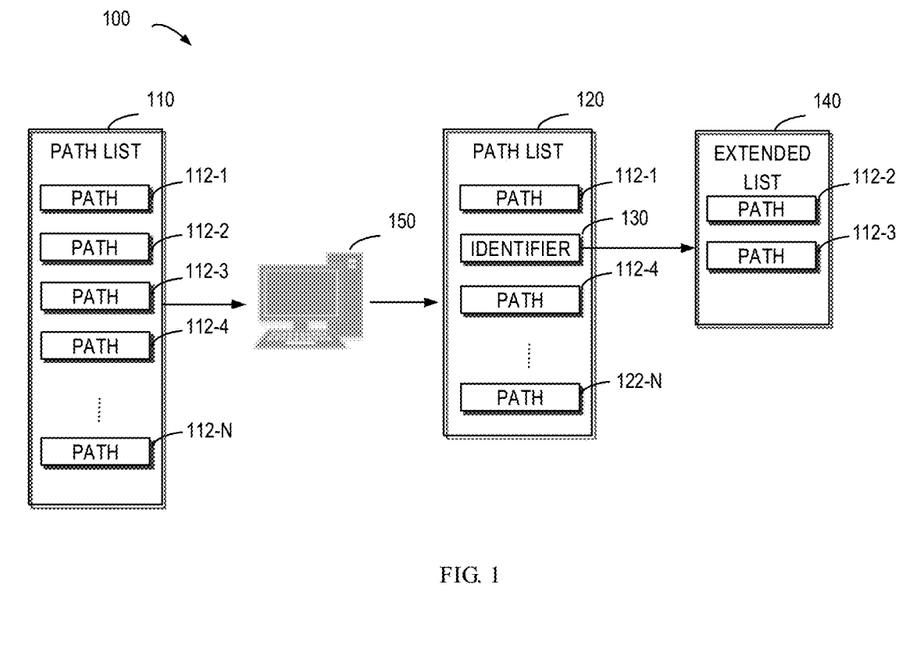
FIG. 1 illustrates a schematic diagram of an example environment 100 for file management according to embodiments of the present disclosure.

FIG. 1 illustrates a schematic diagram of an example environment 100 for file management according to embodiments of the present disclosure. As shown, the environment 100 includes an electronic device 150. The electronic device 150 is a computing device capable of managing files, which may be a computer, a server or any other device capable of managing files. Although one electronic device is shown in FIG. 1, it would be appreciated that this is only for the purpose of examples, without suggesting any limitation to the scope of the present disclosure. In some embodiments, the electronic device 150 may include electronic devices in different numbers and/or with varied functions.

The path list 110 may include one or more items each corresponding to a path. As shown in FIG. 1, the path list 100 includes a plurality of paths 112-1, 112-2, 112-3, 112-4, . . . , 112-N, where N is a positive integer. The paths in the path list 110 may be paths of predetermined files (for example, a path c:\windows \system32\a.txt denotes a path of a file a.txt), paths of directories in which the predetermined files are located (for example, a path c:\windows \system32 denotes paths of all files in a directory system32), paths containing matching rules of predetermined files (for example, a path c:\windows\b*.txt denotes paths of all files initiated with the alphabet b), or the like. It would be appreciated that the predetermined files may be any appropriate files, for example, files to be checked virus, files to be backed up, files of interest, or the like.

The electronic device 150 may process the path list 110 to obtain an updated path list 120 and an extended list 140. The updated path list 120 includes one or more paths 112-1, 112-4, . . . , 112-N, where N is a positive integer greater than 1. The updated path list 120 further includes an identifier 130 which indicates the extended list 140. The extended list 140 includes the paths 112-2 and 112-3 which are at least partly the same from the root directory. For example, the path 112-2 is c:\windows \system32\a.txt, the path 112-3 is c:\windows \system32\b*.txt, and they both have the same path c:\windows\system32.

As shown in FIG. 1, as compared with the path list 110, the paths 112-2 and 112-3 of the updated path list 120 are moved into the extended list 140, and the identifier 130 indicating the extended list 140 is inserted into the path list 120. The identifier 130, for example, may indicate the same path of the respective paths in the extended list 140, for example, c:\windows\ system32. The identifier 130 may also indicate an address of the extended list 140, and the like. For example, the identifier 130 may include a pointer pointing to the extended list 140. In this way, the path list 110 may be optimized, thereby reducing a number of items included in the path list 110.

It would be appreciated that the above example is provided only for illustration, rather than a specific limitation on the present disclosure. The updated path list 120 and the extended list 140 can be obtained in any suitable manner as needed. Although one extended list 140 is shown in FIG. 1, it would be appreciated that this is only for the purpose of examples, without suggesting any limitation to the scope of the present disclosure. In some embodiments, the path list 120 may include a plurality of identifiers, each of which may indicate an extended list. In some embodiments, the extended list 140 may further include one or more identifiers, each of which may indicate a further extended list.

The electronic device 150 may further include a processor and a memory. In some embodiments, the memory may store computer programs therein, and instructions of these programs may be executed by the processor to perform operations to control the electronic device. It would be appreciated that the electronic device 150 may further include some other modules and/or means not shown in FIG. 1, such as a communication module, input/output means, and the like.

Figure 2:
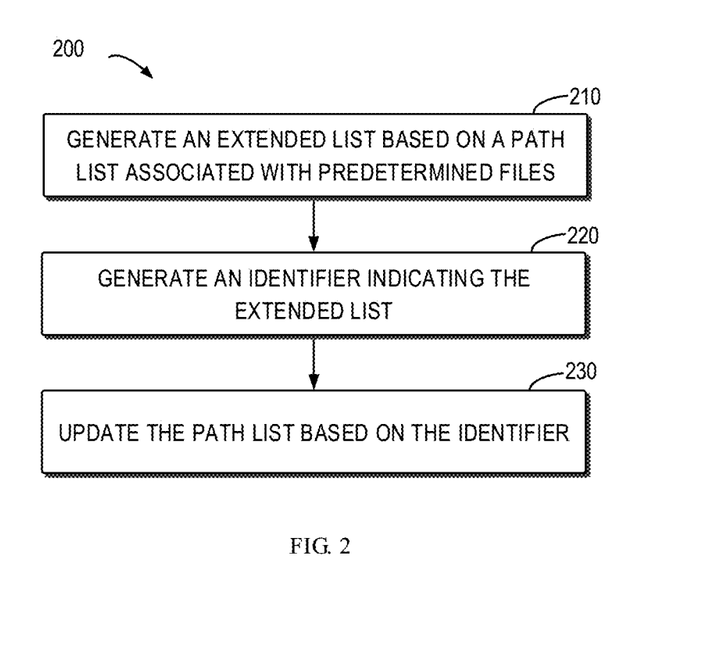
FIG. 2 illustrates a flowchart of a method 200 of file management according to embodiments of the present disclosure.

FIG. 2 illustrates a flowchart of a method 200 of file management according to embodiments of the present disclosure. It would be appreciated that at least a part of the method 200 may be performed by the electronic device 150 as described with reference to FIG. 1. The method 200 may further include blocks not shown and/or skip the blocks shown. The scope of the present disclosure is not limited in the aspect.

At block 210, the extended list 140 is generated based on the path list 110 associated with the predetermined files. Still in reference to FIG. 1, the extended list 140 includes a set of paths 112-2 and 112-3 in the path list 110, which are at least partly the same from the root directory. For example, in the above example, the path 112-2 is c:\windows\ system32\ a.txt, the path 112-3 is c:\windows \system32\b*.txt, and they both have the same path c:\windows \system32 from the root directory disk c.

In some embodiments, the path list 110 may include paths of predetermined files (for example, a path c:\windows\system32\a.txt denotes a path of a file a.txt), paths of directories in which the predetermined files are located (for example, a path c:\windows\system32 denotes paths of all files in a directory system32), or paths containing matching rules of predetermined files (for example, a path c:\windows\b*.txt denotes paths of all text files initiated with the alphabet b). The predetermined files may be any appropriate files, for example, files to be checked virus, files to be backed up, files of interest, or the like. In this way, any required paths may act as key paths, such that these key paths can be identified rapidly during the virus-check or backup operation.

In some embodiments, the paths 112 in the path list 110 may be sorted, for example, according to an order of directory naming which may follow the alphabetical order or the reversed alphabetical order. In some embodiments, in order to optimize the path list 110, a deduplication operation may be performed on the sorted paths 112. For example, a deduplication operation may be performed on a plurality of same paths, to retain a path therefrom, or remove paths covered by others (for example, the path c:\windows\system32\a.txt covered by the path c:\windows\system32). In this way, the path list 110 can be optimized. Alternatively, in some embodiments, in order to simplify operations, the path list 110 may not perform the sorting or deduplication operation.

In some embodiments, in order to obtain a set of paths which are at least partly the same from the root directory, it is required to determine a common path level number. For example, in the path c:\windows\system32\a.txt, the root directory c: is a Level-1 directory, the directory windows is a Level-2 directory, and the directory system32 is a Level number-3 directory, and so on. If two paths both include c:\windows\system32, the common path level number of the two paths is 3. In some embodiments, the common path level numbers may be predetermined by users, or may be determined by the electronic device 150 depending on the path list 110. For example, if the path list 110 includes massive paths having a common path which has a level number is 3, it is determined that the common path level number is 3. In some embodiments, based on the common path level number, a set of paths 112-2 and 112-3 is selected from the paths 112 of the path list 110 to generate an extended list 140 including the set of paths. The set of paths 112-2 and 112-3 has the same subpaths which start from the root directory and end at a directory corresponding to the common path level number. For example, in the above example, the path 112-2 is c:\windows\system32\a.txt, and the path 112-3 is c:\windows\system32\b*.txt, where the common path level number is 3 and the common subpath is c:\windows\system32. In some embodiments, the extended list 140 may be generated based on the set of paths 112-2 and 112-3 having the same subpath. In this way, a plurality of paths having the same subpath may be the paths in the extended list 140, so as to identify rapidly the required key paths in the extended list 140.

In some embodiments, the extended list 140 may be generated based on a number of a set of paths having a same subpath. For example, if the number of the set of paths having the same subpath is greater than a threshold (for example, 300 or 500), the extended list 140 is generated. If the number of the set of paths having the same subpath is less than the threshold, the extended list 140 are not generated. The threshold may be any appropriate number, for example, which may be obtained empirically or preset by the system; and the scope of the present disclosure is not limited in the aspect. If a small threshold is set, massive extended lists 140 may be generated, and if a great threshold is set, few extended lists 140 may be generated. The massive extended lists 140 may occupy too many resources while the few extended lists 140 may incur a long search time in the list. In this way, an appropriate threshold may be set according to the actual paths situation, to generate an appropriate number of extended lists 140 to improve the efficiency of identifying key paths.

Still in reference to FIG. 2, at block 220, an identifier 130 for indicating the extended list 140 is generated. In some embodiments, the identifier 130 may include a first identifier for indicating the subpath, and a second identifier for indicating the address of the extended list 140. In this way, when searching paths in the extended list 140, the desired extended list 140 may be determined rapidly through the identifier 130.

At block 230, the path list 110 is updated based on the identifier 130, to obtain the updated path list 120. The updated path list 120 includes the identifier 130. In some embodiments, the identifier 130 may substitute for each path of the set of paths 112-2 and 112-3 in the path list 110, to obtain the updated path list 120. Alternatively, in some embodiments, as shown in FIG. 1, the set of paths 112-2 and 112-3 having the same subpath may be removed from the path list 110, and the identifier 130 for indicating the extended list 140 may be inserted into the path list 110, to obtain the updated list 120. It would be appreciated that the identifier 130 may be inserted at any appropriate position in the path list 110, for example, an original position of any path in the set of paths 112-2 and 112-3, or other positions. In this way, the set of paths having the same subpath are removed from the path list 110, causing the path list 110 to be optimized.

In some embodiments, a first candidate path in a set of candidate paths is compared with the paths in the updated path list 120, and the set of candidate paths may be a set of paths of all files in the electronic device 150, or may be a set of paths of a part of files in the electronic device 150. If the first candidate path matches the identifier 130, a path corresponding to the first candidate path is searched in the extended list 140. If the path corresponding to the first candidate path is found in the extended list 140, the first candidate path is identified as a key path. This will be described in detail below with reference to the embodiments of FIG. 4.

Figure 3:
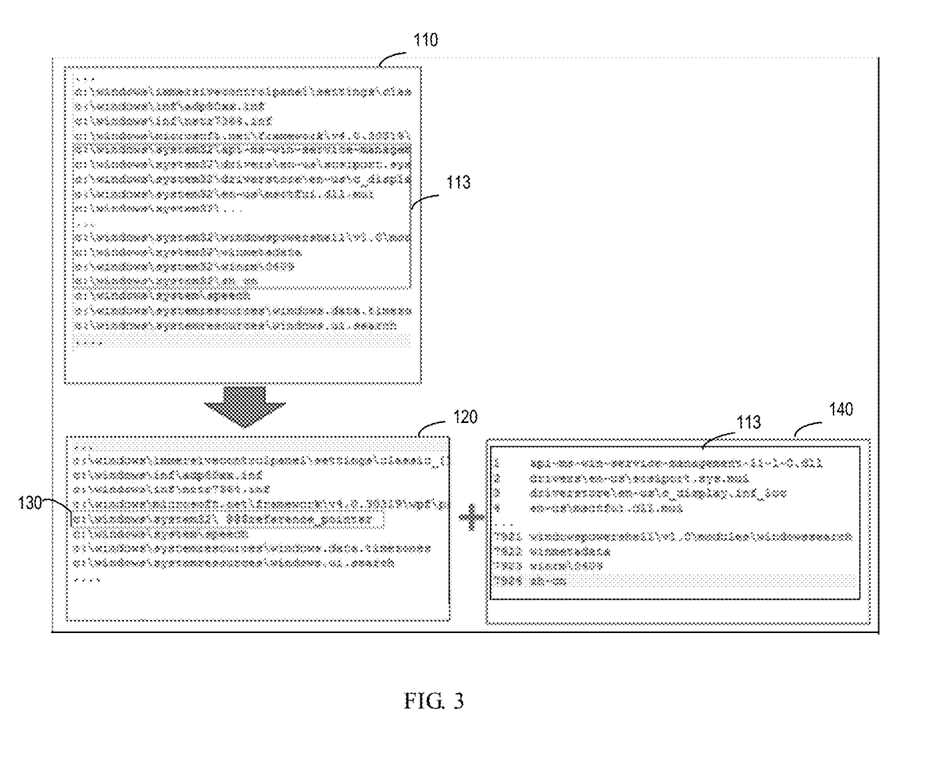
FIG. 3 illustrates a schematic diagram of a generated extended list 140 and an updated path list 120 according to embodiments of the present disclosure.

FIG. 3 illustrates a schematic diagram of the generated extended list 140 and the updated path list 120 according to embodiments of the present disclosure. Although, in the example of FIG. 3, the path list 110, the updated path list 120 and the extended list 140 are sorted in the alphabetic order and undergo a deduplication operation, it would be appreciated that the path list 110, the updated path list 120 and the extended list 140 may be unsorted or not undergo the deduplication operation.

As shown in FIG. 3, the path list 110 includes a plurality of paths. Since more paths in the path list 110 have a common path with a level number 3, a set of paths 113 with the common path level number 3 is selected from the path list 110 to generate the extended list 140, and the set of paths 113 include subpaths which are at least partly the same from the root directory. For example, the set of paths 113 have subpaths which are the same from the root directory (c:) to the Level-3 directory (system32). The generated extended list 140 includes the set of paths 113. As described above, the common path level number may be preset by users, or may be determined by the electronic device 150 based on the path list 110. For example, if a number of common paths with the level number 3 in the path list 110 is greater than a preset threshold, the common path level number is determined as 3. Although the set of paths 130 in the extended list 140 in FIG. 3 is shown with residual paths, other than the same subpaths, it would be appreciated that the set of paths 130 in the extended list 140 may be complete paths from the root directory. In this way, an appropriate extended list 140 can be generated to improve the efficiency of identifying the key paths.

In the example of FIG. 3, the identifier 130 for indicating extended list 140 is generated, which may include a first identifier for indicating the subpath c:\windows\system32 and a second identifier @@reference_pointer for indicating the address of the extended list 140. In order to update the path list 110, the set of paths 113 of the path list 110 may be removed, and the identifier 130 for indicating the extended list 140 may be inserted into the path list 110, to obtain the updated list 120. In the example of FIG. 3, since the path list 110 is sorted, the identifier 130 is inserted into the original position of the set of paths 130. However, if the path list 110 is unsorted, the identifier 130 may be inserted into any position of the path list 110. In this way, the path list 110 can be optimized, thereby obtaining the optimized path list 120.

Figure 4:
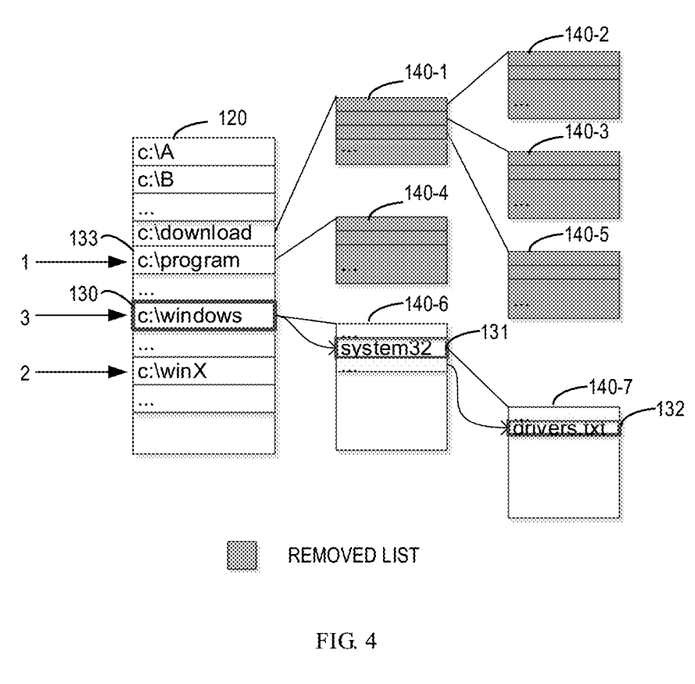
FIG. 4 illustrates a schematic diagram of identifying a key path based on the updated path list 120 and the generated extended list, according to embodiments of the present disclosure.

FIG. 4 illustrates a schematic diagram of identifying a key path based on the path list 120 updated and the generated extended list, according to embodiments of the present disclosure. FIG. 4 shows a path list 120 and extended lists 140-1, 140-2, 140-3, 140-4, 140-5, 140-6 and 140-7 which may be collectively referred to as extended list 140. In the example, the first candidate path c:\windows\system32\drivers.txt is taken as an example to illustrate how a path corresponding to c:\windows\system32\drivers.txt is searched in the path list updated (hereinafter referred to as "updated path list") 120 and the extended list 140.

As shown in FIG. 4, the updated path list 120 includes one or more items, each of which may be a path or an identifier. For clarity, in FIG. 4, the items 130, 131, 134 and 135, as identifiers, are only shown as including a first identifier for indicating a respective subpath, while a second identifier (for example, a pointer) for indicating an address of a respective extended list is omitted. The updated path list 120 may be a sorted list, for which binary searching may be employed.

Likewise, the extended list 140 may also include one or more items, each of which may be a path.

In the example of FIG. 4, a number of items in the updated path list 120, for example, is M, which is a positive integer greater than 1. For ease of illustration, M=40, namely the number of items of the updated path lists 120, is taken as an example. The item 133 (for example, the 20$^{th}$ item) in the middle of the updated path list 120, which is c:\program in the example of FIG. 4, is compared with the first candidate path. Since c:\program does not match the first candidate path c:\windows\system32\drivers.txt, it needs to continue searching.

According to the alphabetical order, c:\windows\system32\drivers.txt should follow c:\program, and therefore, an item in a middle position of a list section following c:\program. In the example, given that the remaining part of the list only includes 20 items, an item (for example, the 10$^{th}$ item in the 20 items) c:\winX is compared with the first candidate path. As c:\winX does not match the first candidate path c:\windows \system32\drivers.txt, it needs to continue searching.

According to the alphabetical order, c:\windows\system32\drivers.txt should precede c:\winX, and therefore, an item in a middle position of a list section between c:\system and c:\winX is compared with the first candidate path. Given that the list section only includes 10 items, an item (for example, the 5$^{th}$ item in the 10 items) c:\windows in the middle position of the 10 items is compared with the first candidate path. Through comparison, the item 130 c:\windows matches c:\windows\system32\drivers.txt, and then, the binary searching continues to be performed in the extended list 140-6 indicated by the item 130 as the identifier. The binary searching in the extended list 140-6 is identical to the searching way in the updated path list 120, as described above, which is omitted here.

By binary searching in the extended list 140-6, another item 131 matching the candidate path c:\windows\system32\drivers.txt can be determined. Therefore, the binary searching can be further performed in the extended list 140-7 indicated by the item 131 as the identifier. The binary searching in the extended list 140-7 is identical to the searching way in the updated path list 120, as described above, which is omitted herein. By searching in the extended list 140-7, an item 132 corresponding to the first candidate path c:\windows\system32\drivers.txt can be determined. After determining that the item 132 corresponding to the first candidate path is found in the search list 140-7, the first candidate path may be identified as a key path, so as to facilitate operations of virus check, backup and the like, for the first candidate path. In a similar way, all candidate paths in the set of candidate paths may be searched in the updated path list 120 and the extended list 140, to obtain a set of key paths, thereby allowing the electronic device 150 to perform operations of virus check, backup, and the like. In this way, the electronic device 150 can determine all key paths of interest rapidly.

Although FIG. 4 shows using binary searching for path searching, it would be appreciated that any other appropriate manner may also be used for path searching. For example, if the first candidate path is compared with items in the updated path list 120 one by one, it can also be determined that the item 130 matches the first candidate path c:\windows\system32\drivers.txt, and thus, the searching continues to be performed in the extended list 140-6. As such, it can be determined finally that the item 132 in the extended list 140-7 corresponds to the first candidate path, and the first candidate path thus is identified as a key path. Such one-by-one searching is applicable to both of the sorted and unsorted lists. As compared with the binary searching, the one-by-one search has a slower search speed, but is significantly faster in the updated path list 120 and the extended list 140 than in the path list 110 not optimized.

In the above example, the first candidate path c:\ windows \system32\drivers.txt is taken as an example to describe the flow of identifying a key path. It would be appreciated that, if c:\A is taken as an example, an item corresponding to c:\A can be determined just in the updated path list 120. Further, if d:\A not included in the updated path list 120 and the extended list 140 is taken as an example, an item corresponding to d:\A cannot be found in the updated path list 120 and the extended list 140, and d:\A thus is not identified as a key path.

As shown in FIG. 4, by generating a plurality of extended lists 140, a plurality of sets of items having a same subpath can be moved into a plurality of extended lists, to obtain an optimized updated path list 120. As a result, when searching the first candidate path, the electronic device 150 can skip a large amount of mismatched items, to determine an item corresponding to the first candidate path in the extended lists and the updated path list rapidly.

In some embodiments, if all of candidate paths in the set of candidate paths matching an identifier of a certain extended list have been compared with paths in the path list, the extended list can be removed to release a part of memory resources of the electronic device 150.

Still in reference to FIG. 4, taking the item 133 as an example, the item 133 as the identifier indicates the extended list 140-4 which corresponds to the subpath c:\program. The electronic device 150 selects candidate paths in the set of candidate paths, directory by directory, and layer by layer, and therefore, once all of the candidate paths matching the item 133 are searched in the extended list 140-4, there will be no other candidate paths matching the item 133 in the set of candidate paths, and searching will not be performed in the extended list 140-4 accordingly.

Therefore, as long as there is a first candidate path matching the item 133, a next candidate path selected by the electronic device 150 from the set of candidate paths also matches the item 133, and a second candidate path selected next does not match the item 133 any longer, until all of the candidate paths matching the item 133 are selected. It means that all of the candidate paths matching the item 133 have been compared with the paths in the extended list 140-4, and in the case, the extended list 140-4 can be removed. In addition, the identifier of the extended list 140-4 may be removed from the updated path list 120.

As shown in FIG. 4, given that all of the candidate paths respectively matching the identifiers of the extended lists 140-1, 140-2, 140-3, 140-4 and 140-5 have been compared with items in the extended lists 140-1, 140-2, 140-3, 140-4 and 140-5, these extended lists can be removed. In this way, the useless extended lists can be removed as soon as possible, thereby releasing more resources to improve the performance of the electronic device 150.

Figure 5:
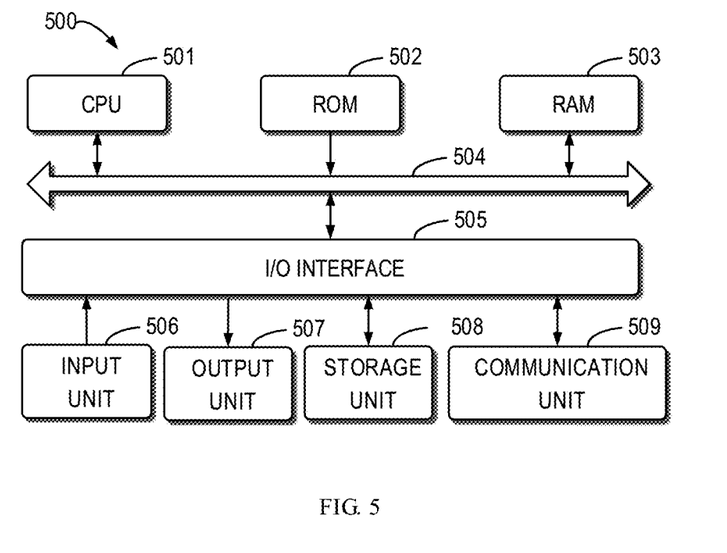
FIG. 5 illustrates a schematic diagram of a device 500 that can be used to implement embodiments of the present disclosure.

FIG. 5 illustrates a schematic block diagram of a device 500 that can be used to implement embodiments of the present disclosure, which may be the electronic device 150 as described above with reference to FIG. 1. As shown, the device 500 includes a central processing unit (CPU) 501 that can perform various appropriate acts and processing based on computer program instructions stored in a read-only memory (ROM) 502 or computer program instructions loaded from a storage unit 508 to a random access memory (RAM) 503. In the RAM 503, there further store various programs and data needed for operations of the device 500. The CPU 501, ROM 502 and RAM 503 are connected to each other via a bus 504. An input/output (I/O) interface 505 is also connected to the bus 504.

The following components in the device 500 are connected to the I/O interface 505: an input unit 506, such as a keyboard, a mouse and the like; an output unit 507, such as various kinds of displays and a loudspeaker, etc.; a storage unit 508, such as a magnetic disk, an optical disk, and etc.; a communication unit 509, such as a network card, a modem, and a wireless communication transceiver, etc. The communication unit 509 allows the device 500 to exchange information/data with other devices through a computer network such as the Internet and/or various kinds of telecommunications networks.

Various methods or processes described above can be executed by the processing unit 501. For example, in some embodiments, the methods can be implemented as a computer software program that is tangibly embodied on a machine readable medium, e.g., the storage unit 508. In some embodiments, part or all of the computer programs can be loaded and/or mounted onto the device 500 via ROM 502 and/or communication unit 509. When the computer program is loaded to the RAM 503 and executed by the CPU 501, one or more steps of the methods or processes as described above can be executed.

In some embodiments, the methods and processes as described above may be implemented as a computer program product. The computer program product may include a computer readable storage medium on which computer readable program instructions are carried out for performing each aspect of the present disclosure.

The computer readable medium may be a tangible medium that may contain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium would include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of file management, comprising:
   obtaining a path list of a plurality of paths indicating storage locations of files in a storage unit;
   setting a threshold;
   determining a common path level number;
   generating an extended list based on the path list, the extended list comprising a set of residue paths corresponding to paths from the path list that have the same subpath that starts from a root directory and ends at a directory corresponding to the common path level number, each of the residue paths comprising a path of the corresponding storage location less the subpath;
   generating an identifier indicating storage location of the extended list;
   updating the path list by replacing in the path list each path corresponding to the set of paths with the subpath that starts from the root directory and ends at the directory corresponding to the common path level number and the identifier; and,
   wherein the common path level number is determined as a level number resulting in number of paths having the same subpath surpassing the threshold.

2. The method of claim 1, wherein generating the extended list comprises:
   sorting the paths in the path list in an order of directory names;
   selecting the set of paths from the sorted paths based on the common path level number; and
   generating the extended list to comprise the set of paths.

3. The method of claim 2, wherein selecting the set of paths from the sorted paths comprises:
   performing a deduplication operation on the sorted paths to obtain deduplicated paths; and
   selecting the set of paths from the deduplicated paths.

4. The method of claim 2, wherein generating the identifier indicating the extended list comprises at least one of the following:
   generating a first identifier to indicate the subpath; or
   generating a second identifier to indicate an address of the extended list.

5. The method of claim 1, wherein updating the path list comprises:
   removing the set of paths from the path list; and
   inserting the identifier of the extended list into the path list.

6. The method of claim 1, further comprising:
   comparing a first candidate path in a set of candidate paths with the paths in the path list;
   in response to the first candidate path matching the identifier of the extended list, searching in the extended list for a path corresponding to the first candidate path; and
   in response to finding the path corresponding to the first candidate path in the extended list, identifying the first candidate path as a key path.

7. The method of claim 6, further comprising:
   in response to all candidate paths in the set of candidate paths matching the identifier of the extended list having been compared with the paths in the path list, removing the extended list.

8. An electronic device for file management, the device comprising:
   a processor; and
   a memory storing computer program instructions, the processor executing the computer program instructions in the memory to control the electronic device to perform operations, the operations comprising:
      obtaining a path list of a plurality of paths indicating storage locations of files in a storage unit;
      setting a threshold;
      determining a common path level number;
      generating an extended list based on the path list, the extended list comprising a set of residue paths corresponding to paths from the path list that have the same subpath that starts from a root directory and ends at a directory corresponding to the common path level number, each of the residue paths comprising a path of the corresponding storage location less the subpath;
      generating an identifier indicating storage location of the extended list;

updating the path list based on the identifier by removing the set of paths from the path list and inserting instead the identifier of the extended list into the path list, the identifier comprising the subpath that starts from the root directory and ends at the directory corresponding to the common path level number; and, wherein the common path level number is determined as a level number resulting in number of paths having the same subpath surpassing the threshold.

9. The device of claim 8, wherein generating the extended list comprises:

sorting the paths in the path list in an order of directory names;

determining a common path level number corresponding to the extended list;

selecting the set of paths from the sorted paths based on the common path level number; and generating the extended list to comprise the set of paths.

10. The device of claim 9, wherein selecting the set of paths from the sorted paths comprises:

performing a deduplication operation on the sorted paths to obtain deduplicated paths; and selecting the set of paths from the deduplicated paths.

11. The device of claim 9, wherein generating the identifier indicating the extended list comprises at least one of the following:

generating a first identifier to indicate the subpath; or generating a second identifier to indicate an address of the extended list.

12. The device of claim 8, wherein the operations further comprise:

comparing a first candidate path in a set of candidate paths with the paths in the path list;

in response to the first candidate path matching the identifier of the extended list, searching, in the extended list for a path corresponding to the first candidate path; and in response to finding the path corresponding to the first candidate path in the extended list, identifying the first candidate path as a key path.

13. The device of claim 12, wherein the operations further comprise:

in response to all candidate paths in the set of candidate paths matching the identifier of the extended list having been compared with the paths in the path list, removing the extended list.

14. A non-transitory computer storage medium having machine executable instructions stored therein, which when executed by a device, cause the device to perform operations, the operations comprising:

obtaining a path list of a plurality of paths indicating storage locations of files in a storage unit;

setting a threshold;

determining a common path level number;

generating an extended list based on the path list, the extended list comprising a set of residue paths corresponding to paths from the path list that have the same subpath that starts from a root directory and ends at a directory corresponding to the common path level number, each of the residue paths comprising a path of the corresponding storage location less the subpath;

generating an identifier indicating the extended list; and updating the path list based on the identifier by removing the set of paths from the path list and inserting instead the identifier of the extended list into the path list, the identifier comprising the subpath that starts from the root directory and ends at the directory corresponding to the common path level number; and, wherein the common path level number is determined as a level number resulting in number of paths having the same subpath surpassing the threshold.

* * * * *